United States Patent
Nagata

(10) Patent No.: US 12,153,394 B2
(45) Date of Patent: Nov. 26, 2024

(54) CONTROL DEVICE, RECORDING MEDIUM STORING MANAGEMENT PROGRAM, AND CONTROL SYSTEM

(71) Applicant: OMRON CORPORATION, Kyoto (JP)

(72) Inventor: Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 552 days.

(21) Appl. No.: 17/425,049

(22) PCT Filed: Feb. 4, 2020

(86) PCT No.: PCT/JP2020/004108
§ 371 (c)(1),
(2) Date: Jul. 22, 2021

(87) PCT Pub. No.: WO2020/175031
PCT Pub. Date: Sep. 3, 2020

(65) Prior Publication Data
US 2022/0100162 A1 Mar. 31, 2022

(30) Foreign Application Priority Data
Feb. 27, 2019 (JP) .................................. 2019-033812

(51) Int. Cl.
*G05B 19/05* (2006.01)
*G05B 19/042* (2006.01)
*G05B 19/409* (2006.01)

(52) U.S. Cl.
CPC ......... *G05B 19/058* (2013.01); *G05B 19/042* (2013.01); *G05B 19/054* (2013.01); *G05B 19/409* (2013.01)

(58) Field of Classification Search
CPC .. G05B 19/058; G05B 19/042; G05B 19/054; G05B 19/409; G05B 2219/13144;
(Continued)

(56) References Cited

U.S. PATENT DOCUMENTS 5,446,903 A * 8/1995 Abraham ............ G06F 12/1483
707/999.009
2004/0030915 A1* 2/2004 Sameshima ............. H04L 63/10
726/1
(Continued)

FOREIGN PATENT DOCUMENTS

CN 105182880 A 12/2015
CN 105824283 A 8/2016
(Continued)

OTHER PUBLICATIONS

Chinese Office Action dated Nov. 13, 2023 in Chinese Application No. 202080009943.4.
(Continued)

*Primary Examiner* — Christopher E. Everett
(74) *Attorney, Agent, or Firm* — Sughrue Mion, PLLC

(57) ABSTRACT

An object is to provide a function of managing data exchanged with an external device. A control device defines a publishing setting of a process value in accordance with information on one or both of an execution result of a control program and an operating state of the control device. The control device exchanges a data set including a part of one or more process values with the external device in accordance with the defined publishing setting.

18 Claims, 8 Drawing Sheets

(58) Field of Classification Search
CPC ........... G05B 2219/31457; G05B 2219/34038; H04L 63/1408; H04L 63/10; G06F 21/602; G06F 21/6218
See application file for complete search history.

(56) References Cited

U.S. PATENT DOCUMENTS

| | | | | |
|---|---|---|---|---|
| 2007/0078862 | A1* | 4/2007 | Chand | G06F 16/282 |
| 2009/0077662 | A1* | 3/2009 | Law | G05B 19/0426 |
| | | | | 726/23 |
| 2009/0222885 | A1* | 9/2009 | Batke | H04L 63/0823 |
| | | | | 713/168 |
| 2010/0017879 | A1* | 1/2010 | Kuegler | G06F 21/123 |
| | | | | 726/25 |
| 2011/0264240 | A1* | 10/2011 | Pettigrew | G05B 19/042 |
| | | | | 700/7 |
| 2012/0065748 | A1* | 3/2012 | Nixon | G05B 21/02 |
| | | | | 700/73 |
| 2012/0209411 | A1 | 8/2012 | Ohkado et al. | |
| 2013/0006391 | A1 | 1/2013 | Kito et al. | |
| 2013/0070788 | A1* | 3/2013 | Deiretsbacher | H04L 67/12 |
| | | | | 370/466 |
| 2013/0245792 | A1 | 9/2013 | Anzai et al. | |
| 2016/0219054 | A1 | 7/2016 | Nagata | |
| 2017/0093885 | A1 | 3/2017 | Houmb | |
| 2017/0257370 | A1 | 9/2017 | Bretschneider | |
| 2018/0032050 | A1* | 2/2018 | Hiraishi | G05B 19/045 |
| 2018/0181133 | A1 | 6/2018 | Zhang et al. | |
| 2018/0259929 | A1 | 9/2018 | Eguchi et al. | |
| 2019/0294137 | A1 | 9/2019 | Kawanoue et al. | |
| 2019/0309619 | A1* | 10/2019 | Hoeink | H04L 63/0428 |

FOREIGN PATENT DOCUMENTS

| | | |
|---|---|---|
| DE | 10 2009 026 443 A1 | 12/2010 |
| EP | 3373087 A1 | 9/2018 |
| JP | 2005-250993 A | 9/2005 |
| JP | 2013-012050 A | 1/2013 |
| JP | 2013-105218 A | 5/2013 |
| JP | 2013-206231 A | 10/2013 |
| JP | 2014-099014 A | 5/2014 |
| JP | 2017-157219 A | 9/2017 |
| WO | 2018110259 A1 | 6/2018 |

OTHER PUBLICATIONS

European Office Action dated May 30, 2023 in Application No. 20 763 851.1.
International Search Report for PCT/JP2020/004108 dated Mar. 24, 2020 [PCT/ISA/210].
Written Opinion for PCT/JP2020/004108 dated Mar. 24, 2020 [PCT/ISA/237].
Extended European Search Report dated Oct. 21, 2022 in Application No. 20763851.1.
Office Action issued Apr. 17, 2024 in Chinese Application No. 202080009943.4.

* cited by examiner

CONTROL DEVICE, RECORDING MEDIUM STORING MANAGEMENT PROGRAM, AND CONTROL SYSTEM

CROSS REFERENCE TO RELATED APPLICATIONS

This application is a National Stage of International Application No. PCT/JP2020/004108 filed Feb. 4, 2020, claiming priority based on Japanese Patent Application No. 2019-033812 filed Feb. 27, 2019, the entire contents of each of which being herein incorporated by reference in their entireties.

TECHNICAL FIELD

The present invention relates to a function of managing data exchange between a control device that executes a control program for controlling a control target and an external device.

BACKGROUND ART

A control device such as a programmable logic controller (PLC) is introduced in various manufacturing scenes. Such a control device is one type of computer and executes a control program designed in accordance with a manufacturing device or a manufacturing facility. Such a control device is communicably connected with an external device such as a human machine interface (HMI).

Japanese Patent Laying-Open No. 2013-012050 (PTL 1) discloses, as such an external device, a display system that is allowed to structurally and visually represent the entirety of a control program to allow easy recognition of the execution sequence and execution status of the control program.

Japanese Patent Laying-Open No. 2013-105218 (PTL 2) discloses a display device that is connected with a control device that controls various industrial systems to issue a control command to the control device and display screen data, and that is allowed to easily find out device information.

CITATION LIST

Patent Literature

PTL 1: Japanese Patent Laying-Open No. 2013-012050
PTL 2: Japanese Patent Laying-Open No. 2013-105218

SUMMARY OF INVENTION

Technical Problem

The external device obtains information indicating a situation in which a control program is executed or information about a device from the control device, thereby implementing the functions disclosed in PTL 1 or PTL 2. As disclosed in PTL 1 and PTL 2, the external device communicably connected with the control device is required to have various functions such as a function of displaying a situation in which a program is executed and a function of displaying device information.

These functions are, however, functions used in a specific situation in a manufacturing scene and are not used constantly. In other words, data required to be exchanged between the external device and the control device varies depending on situations. It is thus required to manage data exchanged with the external device.

The invention of the present application has an object to provide a function of managing data exchanged with an external device as described above.

Solution to Problem

According to an example of the present disclosure, a control device is provided that executes a control program for controlling a control target. The control device includes: management module configured to manage one or more process values relating to the execution of the control program; communication module configured to exchange data including at least part of the one or more process values with an external device in accordance with a publishing setting for the one or more process values; and publishing management module configured to dynamically determine the publishing setting in accordance with information on at least one of an execution result of the control program and an operating state of the control device.

According to the present disclosure, data exchanged with the external device can be managed in accordance with the information on at least one of the execution result of the control program and the operating state of the control device.

In the above disclosure, the publishing setting includes information that defines whether or not each of the one or more process values is allowed to be referred to by the external device.

According to the present disclosure, process values that the external device cannot refer to are defined, leading to an improved security level of the control device.

In the above disclosure, the publishing setting includes information that defines whether or not each of the one or more process values is allowed to be referred to by the external device.

According to the present disclosure, whether or not each process value can be referred to by the external device is defined, enabling a precise setting.

In the above disclosure, the publishing setting includes information that defines whether or not a target process value is changeable in accordance with a command from the external device.

According to the present disclosure, the process value can be changed from the outside of the control device, and such a change can be prohibited depending on the state of the control device.

In the above disclosure, the execution result of the control program includes an operating state of the control target. The publishing management module dynamically determines the publishing setting in accordance with the operating state.

According to the present disclosure, the publishing setting is determined also in accordance with the operating state of the control target, and accordingly, the publishing setting of the process value can be defined according to a more specific situation.

In the above disclosure, the operating state of the control device includes a state in which a change of the control program is allowed and a state in which a change of the control program is prohibited.

According to the present disclosure, a public setting can be defined in accordance with a situation in which a change of the control program is allowed and it is desired to check how the process value has changed due to the change of the control program and a situation in which a change of the control program is not changed and it is desired to check how the control program is being executed.

In the above disclosure, the operating state of the control device is a state that changes in accordance with a result of detection of any unauthorized intrusion occurring in the control device, and the operating state includes a state with no incident occurring and a state corresponding to nature of an occurring incident.

According to the present disclosure, a publishing setting is determined dynamically in accordance with the nature of an incident, leading to an improved security level.

In the above disclosure, when the one or more process values exchanged with the external device include a process value, publishing of which is not allowed, the communication module transmits information indicating that publishing is not allowed.

According to the present disclosure, the information indicating that publishing is not allowed is transmitted, thus allowing an external device 200 to specify that publishing is not allowed. This enables normal data exchange between the external device and the control device even when the process value, publishing of which is not allowed, is a data exchange target.

In the above disclosure, among the one or more process values exchanged with the external device, the communication module converts a process value, publishing of which is not allowed, into predetermined data and transmits the predetermined data.

According to the present disclosure, a process value, publishing of which is not allowed, is also transmitted, enabling normal data exchange between the external device and the control device even when the process value, publishing of which is not allowed, is a data exchange target.

In the above disclosure, the communication module exchanges data with the external device using a communication protocol according to an object linking and embedding for process control unified architecture (OPC-UA).

According to the present disclosure, data can be exchanged with the external device without depending on the type of a vendor or an operating system (OS) of the external device.

In the above disclosure, the control device is communicable with a storage device configured to store publishing setting information in which the publishing setting is associated with a control state defined in accordance with the information on at least one of the execution result of the control program and the operating state of the control device. The publishing management module dynamically determines the publishing setting in accordance with the information on at least one of the execution result of the control program and the operating state of the control device and the publishing setting information.

According to the present disclosure, the publishing setting information for determining a publishing setting is stored in a storage device communicable with the control device, not in the control device. This leads to a smaller amount of memory of the control device than when the publishing setting information is stored in the memory of the control device.

According to another example of the present disclosure, a management program for managing data exchange between a control device configured to execute a control program for controlling a control target and an external device is provided. The management program causes a computer to execute the steps of: managing one or more process values relating to the execution of the control program; exchanging data including at least part of the one or more process values between the control device and the external device in accordance with a publishing setting for the one or more process values; and dynamically determining the publishing setting in accordance with information on at least one of an execution result of the control program and an operating state of the control device.

According to the present disclosure, data exchanged with the external device can be managed in accordance with the information on at least one of the execution result of the control program and the operating state of the control device.

According to another example of the present disclosure, a control system is provided that includes: execution module configured to execute a control program for controlling a control target; management module configured to manage one or more process values relating to the execution of the control program; communication module configured to exchange data including at least part of the one or more process values with an external device in accordance with a publishing setting for the one or more process values; and publishing management module configured to dynamically determine the publishing setting in accordance with information on at least one of an execution result of the control program and an operating state of the execution module.

According to the present disclosure, data exchanged with the external device can be managed in accordance with the information on at least one of the execution result of the control program and the operating state of the execution module.

In the above disclosure, the control system further includes: storage module configured to store publishing setting information in which the publishing setting is associated with a control state defined in accordance with the information on at least one of the execution result of the control program and the operating state of the execution module; and accepting module configured to accept the publishing setting information. The publishing management module dynamically determines the publishing setting in accordance with the information on at least one of the execution result of the control program and the operating state of the execution module and the publishing setting information. The accepting module provides a user interface for defining the publishing setting.

According to the present disclosure, the user interface for defining a publishing setting is provided from the accepting module, thus allowing the user to define any appropriate publishing setting.

Advantageous Effects of Invention

According to an example of the present disclosure, data exchanged with an external device can be managed in accordance with information on at least one of an execution result of a control program and an operating state of a control device.

DESCRIPTION OF EMBODIMENTS

Figure 1:
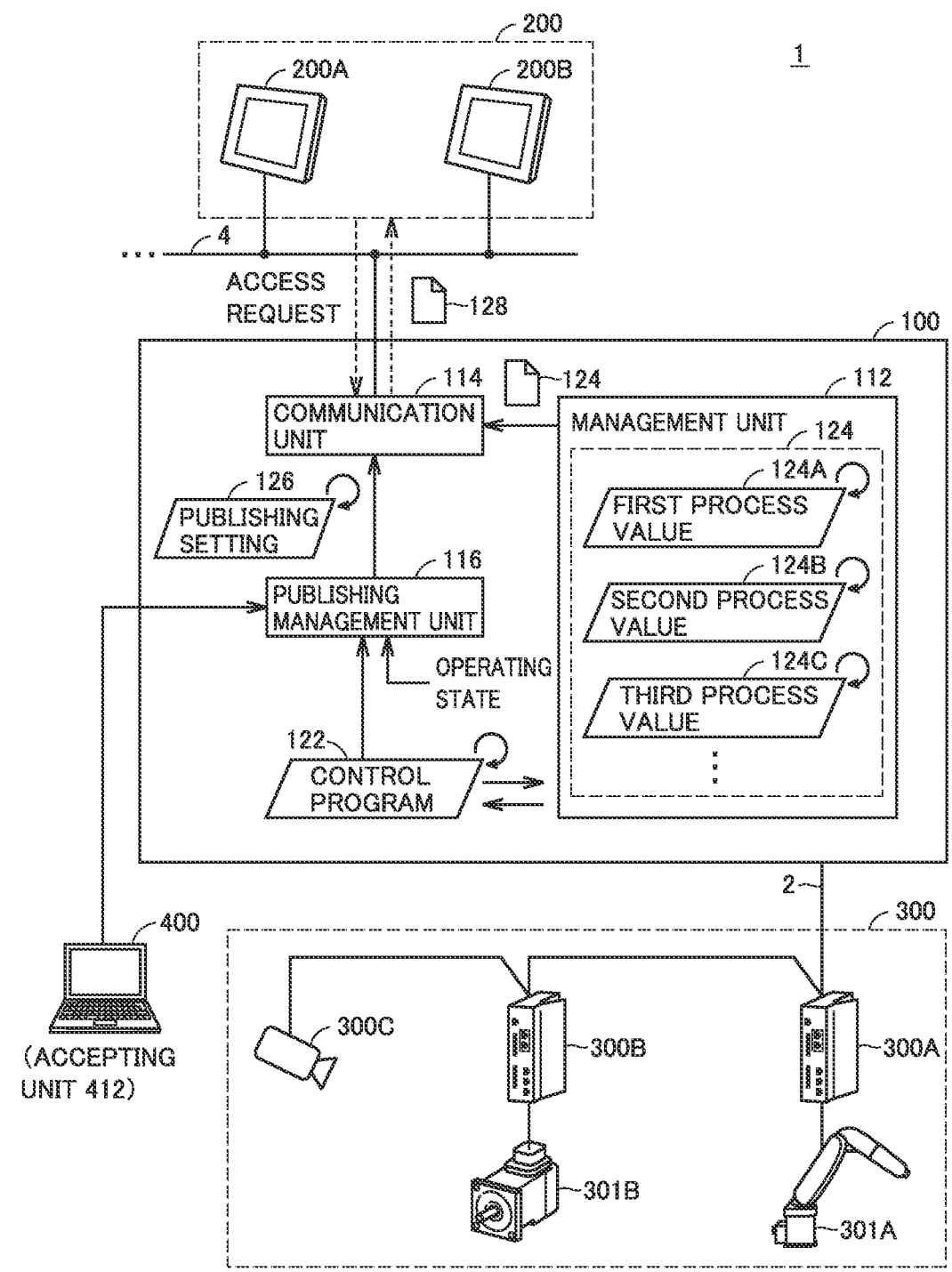
FIG. 1 is a schematic diagram showing an application example of a control system 1 according to an embodiment.

An embodiment of the present invention will now be described with reference to the drawings. The same or corresponding parts in the drawings have the same reference characters allotted. Their names and functions are also the same. Thus, detailed description thereof will not be repeated. The embodiment and variations described below may be combined selectively as appropriate.

A. Application Example

An example of the situation in which the present invention is applied will be described with reference to FIG. 1. FIG. 1 is a schematic diagram showing an application example of a control system 1 according to an embodiment. Control system 1 is, for example, a system for use in a manufacturing factory and includes a field device 300, which is a control target, a control device 100, which controls field device 300, and an external device 200, which exchanges data with control device 100.

Control device 100 is a device, such as a programmable logic control device (PLC), that executes a control program 122 for controlling the control target. Control device 100 is communicably connected with field device 300 that is a control target via a control-related network 2. Control-related network 2 is preferably a network that performs fixed-cycle communications that guarantee a data arrival time. Known examples of such a network that performs fixed-cycle communications include EtherCAT (registered trademark), EtherNet/IP (registered trademark), DeviceNet (registered trademark), and CompoNet (registered trademark).

Control device 100 is communicably connected with external device 200 via an information-related network 4. Information-related network 4 is preferably, for example, a network conforming to a communication standard that enables data exchange without depending on the type of a vendor or an operating system (OS). A known example of such a communication standard is the object linking and embedding for process control unified architecture (OPC-UA). The communication standard adopted in information-related network 4 is not limited to the OPC-UA. For example, information-related network 4 may be a network conforming to a specific vendor or an OS-specific communication standard.

Field device 300 includes various industrial devices for automation of production steps. Field device 300 includes a servo driver that controls a servo motor, a robot controller that controls a robot, a sensor that is a device that collects data, or any other device used in the production steps. Field device 300 may be communicably connected with control device 100 via a remote input/output (I/O) device or an I/O unit. In the example shown in FIG. 1, a robot controller 300A, which controls a robot 301A, a servo driver 300B, which controls a servo motor 301B, and a sensor 300C are communicably connected with control device 100 via control-related network 2, by way of example.

External device 200 outputs various pieces of information obtained by control program 122 executed by control device 100. Specifically, external device 200 outputs various pieces of information obtained by control program 122 executed by control device 100 by referring to a process value 124 obtained during the execution of control program 122. External device 200 typically includes a human machine interface (HMI), a personal computer (PC), a smartphone, a tablet, or any other information processor having a display function. In an example shown in FIG. 1, an HMI 200A and an HMI 200B are communicably connected with control device 100 via information-related network 4, by way of example. External device 200 may have a function of accepting an input of information and generating an internal command or the like to control device 100 in accordance with the input information.

The role of external device 200 may differ depending on the position of a person who operates external device 200 or a situation in which external device 200 is operated. During execution of control program 122 by control device 100 to control field device 300, by way of example, external device 200 is responsible for presenting a situation in which control program 122 is executed. Contrastingly, during maintenance and inspection of control system 1, external device 200 is responsible for presenting information about the states of control device 100 and field device 300 as an example of the information required for maintenance and inspection.

As described above, external device 200 may be required to assume a different role in accordance with the states of control device 100 and field device 300. In other words, external device 200 may be required to output different contents in accordance with, for example, the states of control device 100 and field device 300.

In terms of security, information is preferably output from control device 100 to external device 200 within the scope limited to required output contents. The present embodiment provides a management function for data exchanged between control device 100 and external device 200. Hereinbelow, the functional configuration of control device 100 for implementing the management function will be described, and the management function will also be described.

Control device 100 includes a management unit 112, a communication unit 114, and a publishing management unit 116. These functions are implemented by the processor of control device 100 executing the program for the management function. FIG. 1 shows only main functions for implementing a function of managing information exchanged between control device 100 and external device 200 among the functions included in control device 100.

Management unit 112 manages one or more process values 124 related to the execution of control program 122. In the example shown in FIG. 1, management unit 112 manages a plurality of process values 124 including a first process value 124A, a second process value 124B, and a third process value 124C.

Process value 124 is a concept including data input from field device 300 to control device 100, data output from control device 100 to field device 300, and data obtained in the course of execution of control program 122, and includes various pieces of information obtained by control program 122 executed by control device 100. Process value 124 is updated through the execution of control program 122.

Management unit 112 updates process value 124, for example, in accordance with the execution of control program 122. Typically, management unit 112 periodically performs input/output (I/O) refreshing to periodically update process value 124.

Communication unit 114 exchanges data including at least part of one or more process values 124 with external device 200. Herein, the data exchanged with external device 200 is referred to as a data set 128. Communication unit 114 exchanges data set 128 with external device 200 in accordance with a publishing setting 126 determined by publishing management unit 116.

Publishing management unit 116 dynamically determines publishing setting 126 in accordance with information on at least one of the execution result of control program 122 and the operating state of control device 100.

"Publishing setting" includes a setting of defining whether or not to publish process value 124 to external device 200 or a setting of defining whether or not to allow a change of process value 124. Data exchange between external device 200 and control device 100 in accordance with the publishing setting may be started as being triggered by an access request from external device 200 or as being triggered in a different manner from that of the access request from external device 200. For example, data exchange in accordance with "publishing setting" may be started on condition that communications between external device 200 and control device 100 have been established. In the example shown in FIG. 1, data exchange between external device 200 and control device 100 is started as being triggered by an access request.

"Operating state" includes a state defined in accordance with "operating environment" of control device 100 and a state defined in accordance with the execution state of control program 122 executed by control device 100. "Operating environment" includes, for example, a security environment. The execution state of control program 122 includes, for example, a state in which a change to control program 122 is allowed and a state in which control program 122 is executed.

For example, publishing management unit 116 dynamically determines publishing setting 126 along with a change of the operating state of control device 100. In response to the access request from external device 200, communication unit 114 exchanges process value 124 with external device 200 in accordance with publishing setting 126 determined by publishing management unit 116, along with a change of the operating state of control device 100.

As described above, control device 100 shown in FIG. 1 can define publishing setting 126 of process value 124 in accordance with information on at least one of the execution result of control program 122 and the operating state of control device 100, and can accordingly improve the security level for process value 124. Publishing setting 126 of process value 124 is dynamically determined in accordance with information on at least one of the execution result of control program 122 and the operating state of control device 100, thus eliminating the time and effort required to change publishing setting 126 and also preventing the occurrence of a human error in changing of publishing setting 126.

Control device 100 may be communicably connected with support device 400. Support device 400 provides a user with the functions of creating a program executed by control device 100, debugging, and setting various parameters. Support device 400 and control device 100 are typically connected by a universal serial bus (USB) cable. Support device 400 further includes an accepting unit 412 that accepts publishing setting information for determining publishing setting 126.

The publishing setting information is information in which publishing setting 126 is associated with a mode of control device 100 which is defined in accordance with information on at least one of the execution result of control program 122 and the operating state of control device 100. Accepting unit 412 provides a user interface for defining a publishing setting. In other words, as support device 400 includes accepting unit 412, the user can define any publishing setting.

B. Hardware Configuration

Figure 2:
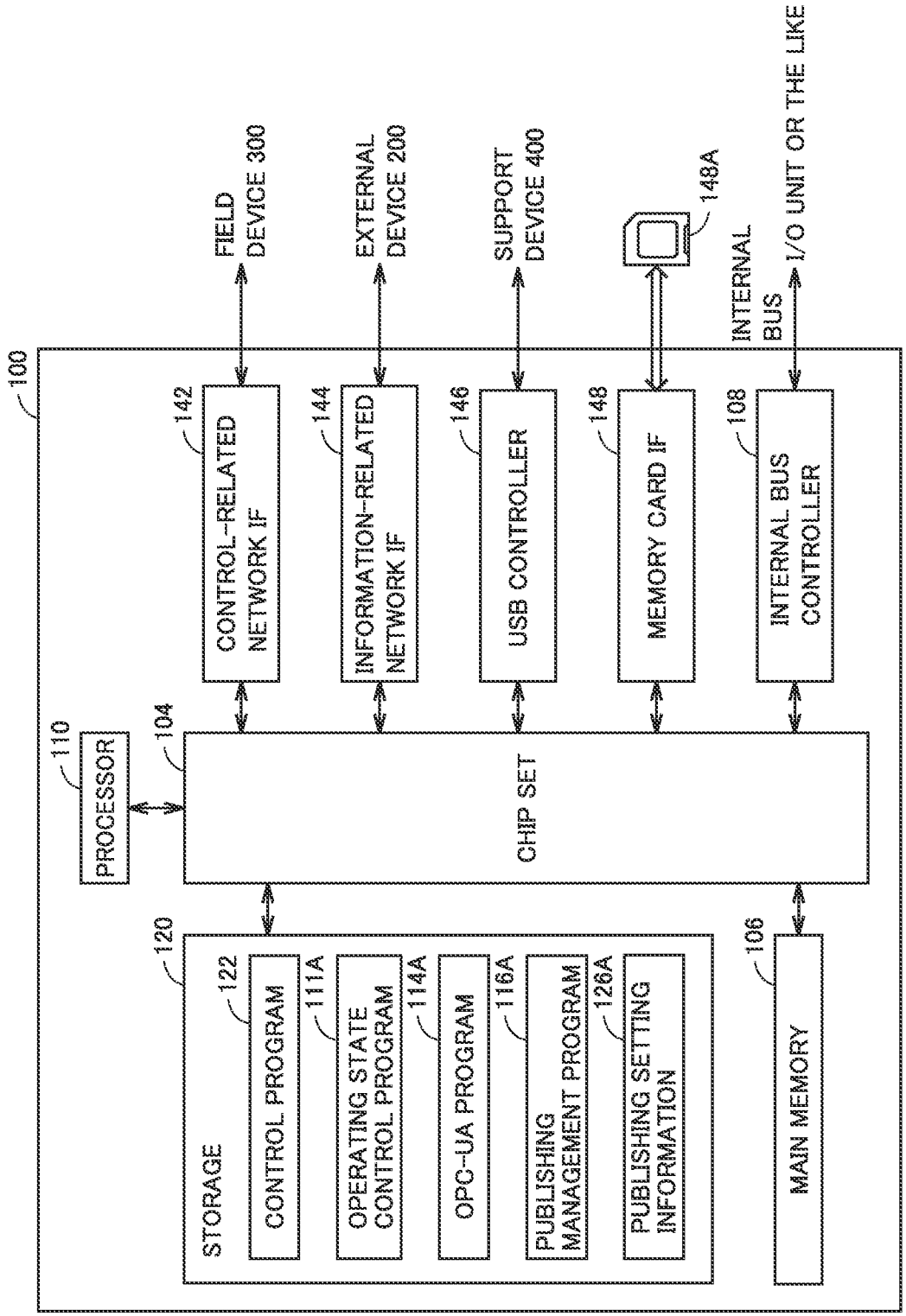
FIG. 2 is a schematic diagram showing an example hardware configuration of a control device 100.
Figure 3:
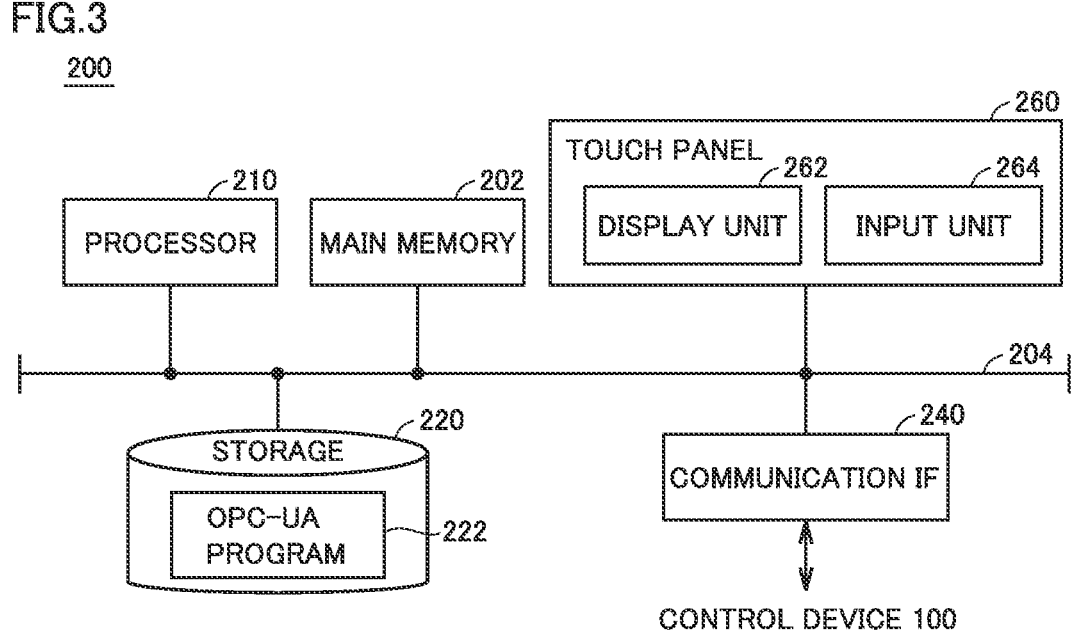
FIG. 3 is a schematic diagram showing an example hardware configuration of an external device 200.
Figure 4:
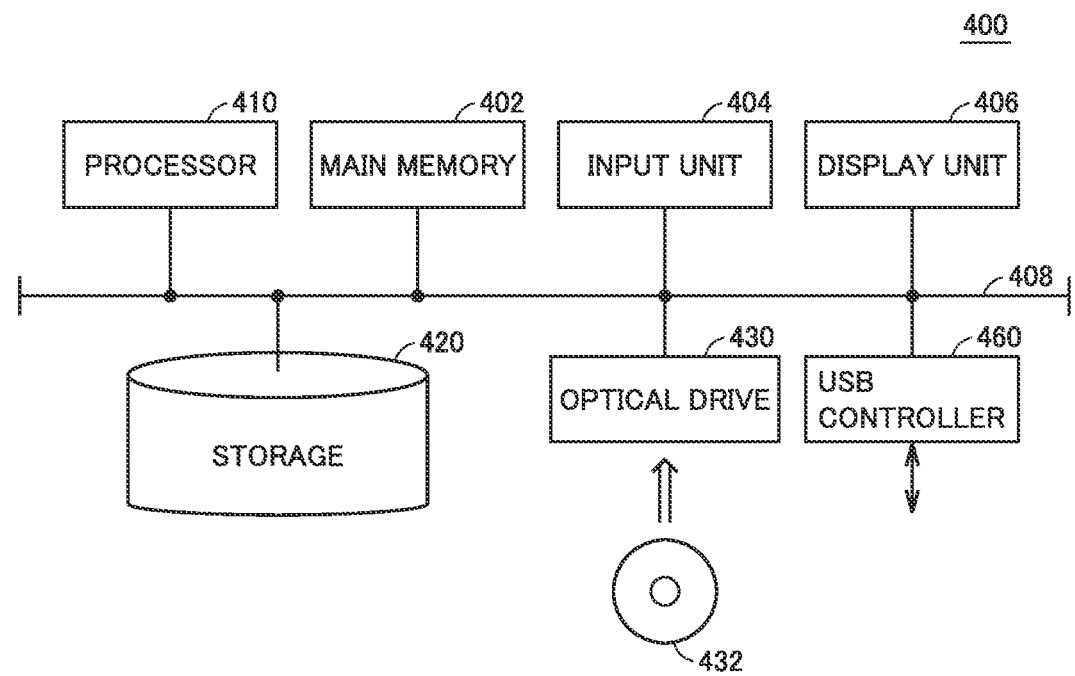
FIG. 4 is a schematic diagram showing an example hardware configuration of a support device 400.

A hardware configuration of a device included in control system 1 will be described in order with reference to FIGS. 2 to 4. FIG. 2 is a schematic diagram showing an example hardware configuration of control device 100. FIG. 3 is a schematic diagram showing an example hardware configuration of external device 200. FIG. 4 is a schematic diagram showing an example hardware configuration of support device 400.

(B1. Hardware Configuration of Control Device 100)

Referring to FIG. 2, control device 100 includes a processor 110 such as a central processing unit (CPU) or a graphical processing unit (GPU), a chip set 104, a storage 120, a main memory 106, a control-related network interface (IF) 142, an information-related network IF 144, a USB controller 146, a memory card IF 148, and an internal bus controller 108 as main components.

Processor 110 executes control program 122 and implements the management function described above by reading various programs stored in storage 120, deploying the various programs to main memory 106, and executing the various programs. In other words, processor 110 has a function as execution module for executing control program 122. Chip set 104 implements processing as the entire control device 100 by mediating data exchange between processor 110 and each component.

Storage 120 stores control program 122, an operating state control program 111A, an OPC-UA program 114A, a publishing management program 116A, and publishing setting information 126A.

Control program 122 is typically configured to include a user program created through design by the user operating support device 400 and a system program that provides a basic function of control device 100. The user program and the system program implement a user's control object in cooperation with each other, thereby controlling field device 300.

Operating state control program 111A is a program for controlling the operating state of control device 100. Typically, operating state control program 111A is one type of system program that provides a basic function of control device 100.

OPC-UA program 114A is a program for causing control device 100 to function as an OPC-UA server and is a program for performing communications in accordance with the OPC-UA between control device 100 and external device 200. OPC-UA program 114A may be, for example, pre-installed in control device 100 as one type of system program.

Publishing management program 116A is a program for providing a management function of control system 1. Publishing management program 116A may be pre-installed in control device 100 as part of the system program or installed as a user program designed by the user operating support device 400. Publishing management program 116A may be a program configured to include both of the system program and the user program.

Publishing setting information 126A is information referred to for determining a publishing setting and is information in which publishing setting 126 is associated with the mode of control device 100 which is defined in accordance with information on at least one of the execution result of control program 122 and the operating state of control device 100.

Control-related network IF 142 handles data exchange with field device 300.

Information-related network IF 144 handles data exchange with external device 200.

USB controller 146 handles data exchange with any information processor via USB connection. Specifically, USB controller 146 handles data exchange with support device 400. Support device 400 is accessible at least to control device 100 and provides the user with the functions of creating a program executed by control device 100, debugging, and setting various parameters.

Memory card IF 148 is configured such that a memory card 148A is detachable therefrom, and allows writing and reading of data such as a control program and various settings into and from memory card 148A.

Internal bus controller 108 is an interface that exchanges data with, for example, an I/O unit (not shown) mounted in control device 100. For the internal bus, a manufacturer-specific communication protocol may be used, or a communication protocol same as or in conformity with any industrial network protocol may be used.

(B2. Hardware Configuration of External Device 200)

Referring to FIG. 3, external device 200 has a hardware configuration having a general-purpose architecture. In other words, external device 200 is implemented as one type of personal computer. External device 200 may be implemented using dedicated hardware, not using general-purpose hardware.

More specifically, external device 200 includes a processor 210, a storage 220, a main memory 202, a communication IF 240, and a touch panel 260. These components are connected to each other via a processor bus 204.

Processor 210 is configured of a CPU or a GPU. Processor 210 controls external device 200 by reading a program stored in storage 220, deploying the program to main memory 202, and executing the program. Main memory 202 is configured of, for example, a volatile storage device such as a DRAM or an SRAM.

Storage 220 is configured of a nonvolatile storage device such as an HDD or an SSD. Storage 220 stores, for example, an OPC-UA program 222. OPC-UA program 222 is a program for operating external device 200 as an OPC-UA client, and is a program for communications according to the OPC-UA between control device 100 and external device 200. Herein, "OPC-UA client" is an application that transmits a communication request (access request) to control device 100 that is an OPC-UA server.

Communication IF 240 handles data exchange with control device 100. Touch panel 260 includes a display unit 262, which is a display, and an input unit 264, which accepts a user's operation. Display unit 262 and input unit 264 may be configured separately.

(B3. Hardware Configuration of Support Device 400)

Referring to FIG. 4, support device 400 includes a processor 410, a storage 420, a main memory 402, an input unit 404, a display unit 406, an optical drive 430, and a USB controller 460. These components are connected to each other via a processor bus 408.

Processor 410 is configured of a CPU or a GPU. Processor 410 reads a program stored in storage 420, deploys the program to main memory 402, and executes the program, thereby providing the user with the functions of creating a program executed by control device 100, debugging, setting various parameters.

Main memory 402 is configured of a volatile storage device such as a DRAM or an SRAM. Storage 420 is configured of, for example, a nonvolatile storage device such as an HDD or an SSD.

Storage 420 stores a support program for providing a function as support device 400, in addition to an OS for implementing a basic function.

Input unit 404 is composed of a keyboard, a mouse, and the like and accepts a user's operation. Display unit 406 is configured of a display and outputs, for example, a processing result from processor 410.

USB controller 460 exchanges data with control device 100 via USB connection.

Support device 400 has optical drive 430, and reads a program stored in a recording medium 432 (e.g., an optical recording medium such as a digital versatile disc (DVD)), which non-transiently stores a computer-readable program, from recording medium 432 and installs the program in storage 420 or the like.

The support program or the like executed by support device 400 may be installed via computer-readable recording medium 432 and may be installed by being downloaded from, for example, a server device on the network. The function provided by support device 400 according to the present embodiment may be implemented by using part of a module provided by an OS.

C. Processing in Response to Access Request

In the present embodiment, a publish-subscribe-type communication model of OPC-UA is applied to communications between control device 100 and external device 200. Hereinbelow, the communications to which this communication model is applied are also referred to as pub/sub communications. The communication mode between control device 100 and external device 200 may be a communication mode to which a communication model different from the publish-subscribe-type communication model is applied.

In such pub/sub communications according to the present embodiment, control device 100 functions as a publisher that issues data. In contrast, external device 200 functions as a subscriber that receives the data issued by the publisher. Each of control device 100 and external device 200 may have both of the function as a publisher and the function as a subscriber.

In the present embodiment, external device 200 that is an OPC-UA client transmits an access request to control device 100 that is an OPC-UA server to obtain process value 124 managed in control device 100, and based on the obtained process value 124, graphically displays the states of control device 100 and field device 300.

The access request from external device 200 includes a Read request and a Write request. In the case where the access request is the Read request, control device 100 periodically transmits a process value that is an access target to external device 200 in accordance with the publishing setting determined by publishing management unit 116. In the case where the access request is the Write request, control device 100 determines whether or not to perform rewriting in accordance with the publishing setting determined by publishing management unit 116, and when allowing rewriting, rewrites the process value that is the access target to a designated value.

Figure 5:
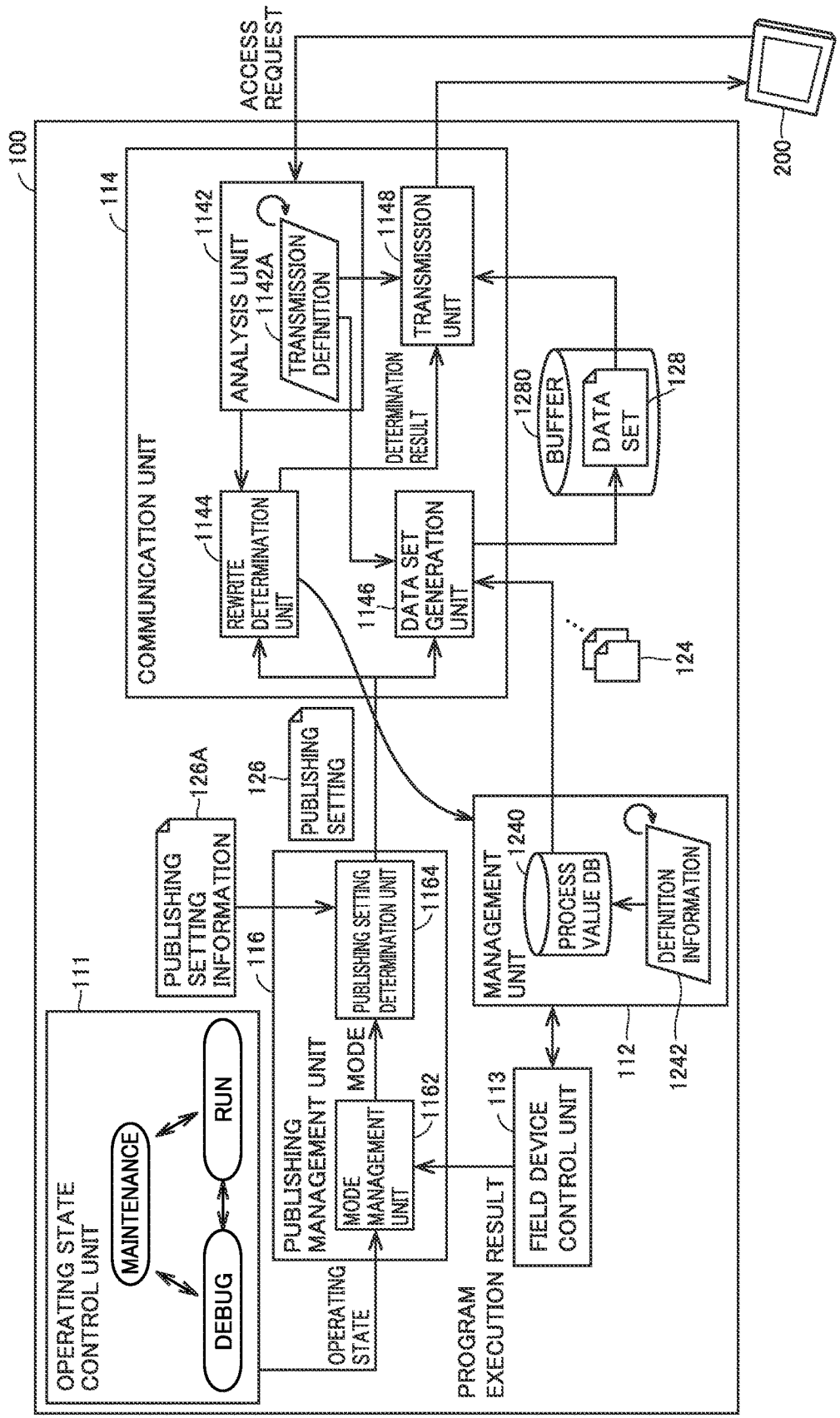
FIG. 5 shows an example functional configuration for implementing processing performed in response to an access request from external device 200.

Processing of control device 100 which is performed in response to an access request from external device 200 will be described with reference to FIG. 5. FIG. 5 shows an example functional configuration for implementing processing performed in response to an access request from external device 200. The functions shown in FIG. 5 are implemented by processor 110 of control device 100 executing various programs stored in storage 120.

Control device 100 includes an operating state control unit 111, a field device control unit 113, a management unit 112, a communication unit 114, and a publishing management unit 116.

Operating state control unit 111 controls the operating state of control device 100. Control device 100 is controlled to at least one operating state of a plurality of operating states. Operating state control unit 111 is a function implemented by processor 110 executing operating state control program 111A shown in FIG. 2. Operating state control program 111A is pre-installed in control device 100 and is one type of system program for providing the function as control device 100. The operating state of control device 100 is typically a state defined by the manufacturer of control device 100. In the example shown in FIG. 5, operating state control unit 111 performs control to any operating state of "debug mode", "run mode", and "maintenance mode".

"Debug mode" refers to a state to which control device 100 is controlled when being booted, and is an operating state to which control device 100 is controlled when a program to be installed on control device 100 is tested. During control in the debug mode, rewriting of control program 122 is allowed.

"Run mode" refers to an operating state in which control device 100 is controlled when executing control program 122, and in which rewriting of control program 122 is prohibited. For example, control device 100 is controlled to the run mode when controlling field device 300 to operate.

"Maintenance mode" refers to an operating state in which control device 100 is not executing control program 122 and control program 122 of control device 100 is rewritable. Control device 100 is controlled to the maintenance mode when being subjected to maintenance or inspection.

In other words, the operating states of control device 100 in the present embodiment are states defined centering around "control program".

Operating state control unit 111 typically shifts the operating state through an operation directly or indirectly performed on control device 100, such as an internal command generated by external device 200, an operation performed on a switch provided in control device 100, or a command from support device 400. These operating states are merely examples, and control device 100 may control two or more types of operating states or four or more types of operating states. Also, control device 100 does not necessarily need to include the operating states shown in FIG. 5.

Field device control unit 113 controls field device 300. Field device control unit 113 is a function implemented by processor 110 executing control program 122 shown in FIG. 2. For example, field device control unit 113 obtains an input value from field device 300 and computes an output value for operating field device 300 based on the obtained input value.

Field device control unit 113 may detect an anomaly in the entire control system 1 including control device 100 based on the obtained input value. Field device control unit 113 may change a parameter used in the computation or an input value referred to, thereby performing a changeover. Field device control unit 113 may also control the operating state of field device 300 based on the obtained input value.

The contents of execution of field device control unit 113 are defined by the user program appropriately created by the user. In other words, the user can appropriately define the contents of execution of field device control unit 113 using support device 400 or the like.

Management unit 112 manages one or more process values 124, as described with reference to FIG. 1. Management unit 112 is a function implemented by processor 110 executing the system program that provides the basic function of control device 100, and is typically a function for I/O refreshing.

Process value 124 includes an input value that can be obtained from field device 300, an output value that is a computation result of field device control unit 113, and data obtained during the computation by field device control unit 113.

Management unit 112 manages a process value database (DB) 1240 to manage process value 124. Specifically, management unit 112 performs I/O refreshing to periodically update process value 124 in process value DB 1240. The cycle in which management unit 112 updates process value 124 may differ depending on the attribute of process value 124. Management unit 112 may also perform processing of rewriting process value 124 in process value DB 1240 into process value 124 included in data set 128 sent from external device 200.

Management unit 112 includes definition information 1242 that defines process value 124 stored in process value DB 1240. Definition information 1242 is updated as, for example, a changeover is performed, a new program is installed, or a program is modified. Management unit 112 updates process value 124 in process value DB 1240 in accordance with definition information 1242.

Communication unit 114 exchanges data set 128 including at least part of one or more process values 124 with external device 200, as described with reference to FIG. 1. Communication unit 114 generates and transmits data set 128. Communication unit 114 is a function implemented by processor 110 executing OPC-UA program 114A shown in FIG. 2. Communication unit 114 includes an analysis unit 1142, a rewrite determination unit 1144, a data set generation unit 1146, and a transmission unit 1148.

Analysis unit 1142 analyzes an access request transmitted from external device 200, and when the access request is the Write request, notifies rewrite determination unit 1144 of an access target. Analysis unit 1142 generates a transmission definition 1142A of data set 128 when the access request is the Read request. Transmission definition 1142A includes information about a transmission cycle and information about an access target.

Rewrite determination unit 1144 determines whether or not to perform rewriting in accordance with publishing setting 126 determined by publishing management unit 116, and when allowing rewriting, instructs management unit 112 to rewrite a process value that is an access target into a designated value. Rewrite determination unit 1144 also notifies external device 200 of the determination result via transmission unit 1148.

Data set generation unit 1146 generates data set 128. Specifically, data set generation unit 1146 collects one or more process values 124 from process value DB 1240 and generates data set 128, in accordance with publishing setting 126 determined by publishing management unit 116 and transmission definition 1142A. Data set generation unit 1146 stores the generated data set 128 in buffer 1280. The data structure of data set 128 will be described below. That data set generation unit 1146 may generate data set 128 every time management unit 112 performs I/O refreshing, or generate data set 128 in accordance with the transmission cycle included in transmission definition 1142A.

Transmission unit 1148 transmits data set 128 stored in buffer 1280 to external device 200 in accordance with transmission definition 1142A. Transmission unit 1148 also transmits the determination result of rewrite determination unit 1144 to external device 200.

Publishing management unit 116 dynamically determines publishing setting 126, as described with reference to FIG. 1. Publishing management unit 116 is a function implemented by processor 110 executing publishing management program 116A shown in FIG. 2. Publishing management unit 116 includes a mode management unit 1162 and a publishing setting determination unit 1164.

Mode management unit 1162 collects information about the execution result of control program 122 and the operating state of control device 100, and based on the collected information, performs control to any mode of a plurality of modes (control states) for defining publishing setting 126. More specifically, mode management unit 1162 collets information about the operating state of control device 100 from operating state control unit 111 and collects information about the execution result of control program 122 from field device control unit 113. The information about the execution result of control program 122 includes, for example, information about an anomaly, information about a changeover, and information indicating the operating state of field device 300.

Publishing setting determination unit 1164 determines publishing setting 126 based on the information on the modes managed by mode management unit 1162 and publishing setting information 126A that defines publishing setting 126 for each mode. Publishing setting information 126A will be described below. For example, when the mode managed by mode management unit 1162 is switched, publishing setting determination unit 1164 determines publishing setting 126 corresponding to the switched mode based on publishing setting information 126A.

Publishing setting 126 includes information about whether or not to allow an access request. Specifically, publishing setting 126 includes information indicating whether or not to publish a process value that is an access target in response to the Read request and information indicating whether or not to allow rewriting of the process value that is the access target in response to the Write request.

Although FIG. 5 shows a configuration example in which necessary functions are provided by processor 110 executing the program, some or all of the provided functions may be implemented using a dedicated hardware circuit (e.g., application specific integrated circuit (ASIC) or a field-programmable gate array (FPGA). Alternatively, the main part of control device 100 may be implemented using hardware (e.g., an industrial personal computer based on a general-purpose personal computer) according to a general-purpose architecture. In this case, a virtual technique may be used to execute a plurality of OSs for different uses in parallel and execute a necessary application on each OS.

FIG. 5 also shows an example in which the above functions are implemented through the execution of different programs. However, programs for executing processing by management unit 112 that manages one or more process values 124, processing of exchanging data including process value 124 in accordance with publishing setting 126 between control device 100 and external device 200, and processing of dynamically determining a publishing setting may be implemented by one program. In other words, the functions shown in FIG. 5 may be divided to be implemented among different programs in cooperation with each other, or may be implemented by one program.

D. Publishing Setting

Figure 6:
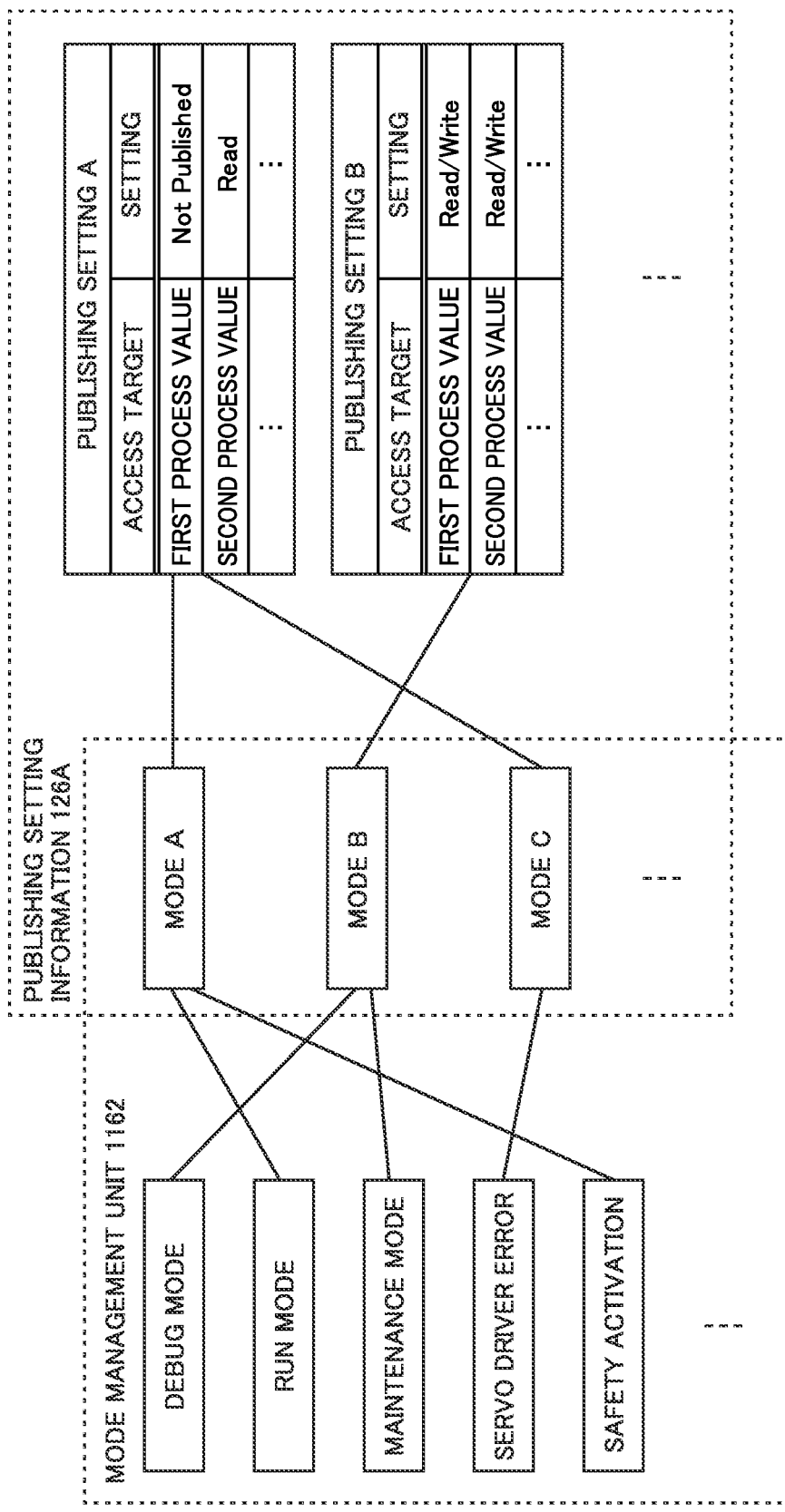
FIG. 6 is a diagram for illustrating a publishing setting.

FIG. 6 is a diagram for illustrating a publishing setting. Publishing setting information 126A is information for defining a publishing setting for each mode. Referring to FIG. 6, publishing setting information 126A defines a publishing setting for each mode. The publishing setting includes information indicating whether or not to publish a process value and information indicating whether or not to allow rewriting (change) of a process value.

In the example shown in FIG. 6, "Read" indicates that publishing of process value 124 is allowed. "Write" indicates that a change of process value 124 is allowed in accordance with a command from external device 200. "Not Published" indicates that publishing of process value 124 is not allowed. When "Not Published" is set, a change of process value 124 is not allowed as well. Hereinbelow, "Read" is also merely referred to as "published", and "Not Published" is also merely referred to as "unpublished".

For example, in the example shown in FIG. 6, mode management unit 1162 performs control to mode B during the maintenance mode. During control in mode B, publishing setting determination unit 1164 determines a publishing setting B. In publishing setting B, each of a first process value and a second process value is published, and a change of the value is allowed.

In this case, when the access request is the Write request and the access targets are the first process value and the second process value, both of the Write request to the first process value and the Write request to the second process value are allowed.

E. Data Structure of Data Set

Figure 7:
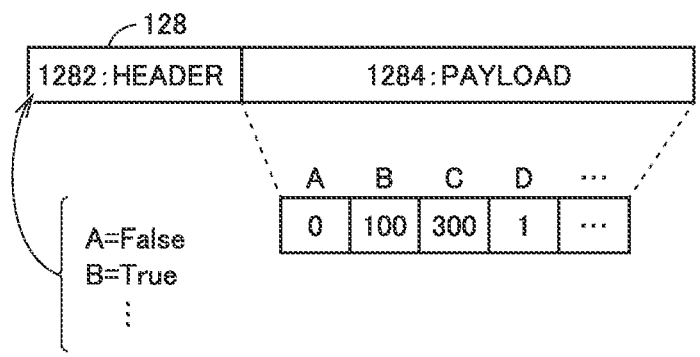
FIG. 7 is a schematic diagram showing an example data structure of a data set 128.

The data structure of data set 128 generated by data set generation unit 1146 will be described. In other words, the structure of data transmitted to external device 200 will be described. FIG. 7 is a schematic diagram showing an example data structure of data set 128.

Data set 128 is composed of a header 1282 and a payload 1284. Data set generation unit 1146 stores all process values that are access targets in payload 1284 regardless of whether they are published or not. Data set generation unit 1146 converts a process value set to be unpublished into predetermined data and stores the data in payload 1284, among process values that are the access targets. In the example shown in FIG. 7, the process value is converted into "0".

For each of the process values stored in payload 1284, data set generation unit 1146 stores information indicating whether the data is valid (true) or invalid (false) in header 1282.

External device 200 that has received data set 128 refers to header 1282 to specify whether a valid process value among the process values stored in payload 1284 is valid data or invalid data.

F. Acceptance of Publishing Setting Information

Figure 8:
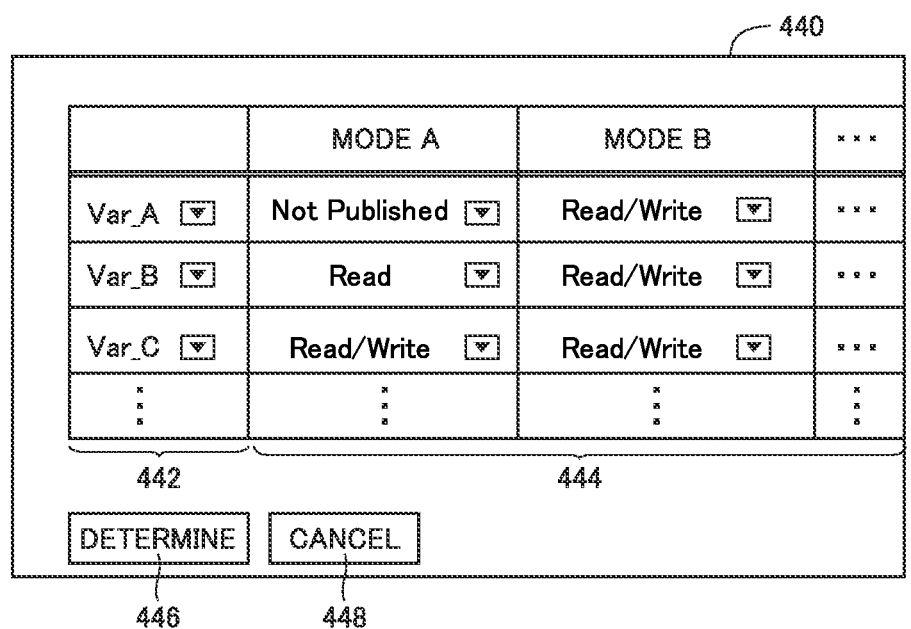
FIG. 8 shows an example user interface that accepts publishing setting information 126A.

FIG. 8 shows an example user interface that accepts publishing setting information 126A. As shown in FIG. 1, support device 400 includes accepting unit 412 that accepts publishing setting information 126A. Accepting unit 412 provides a user interface 440, which accepts publishing setting information 126A. User interface 440 includes a process value accepting area 442, a publishing setting accepting area 444, a determination tab 446, and a cancellation tab 448.

The user designates a process value that is a setting target by operating process value accepting area 442, and for the process value designated through the operation of publishing setting accepting area 444, sets an access request to be allowed for each of the execution result of the control program and the operating state of control device 100.

When determination tab 446 is selected, accepting unit 412 generates publishing setting information 126A in accordance with the information accepted through the operation of process value accepting area 442 and publishing setting accepting area 444. Publishing setting information 126A generated is output from support device 400 to control device 100. As cancellation tab 448 is operated, various pieces of accepted information are discarded, and the acceptance of publishing setting information 126A completes.

G. Operations and Effects

In control device 100, publishing setting 126 of process value 124 is defined in accordance with the information on at least one of the execution result of control program 122 and the operating state of control device 100. The data exchanged with the external device can thus be managed in accordance with the information on at least one of the execution result of control program 122 and the operating state of control device 100. In control device 100, also, publishing setting 126 is changed dynamically in accordance with the execution result of control program 122 or the operating state of control device 100, thus eliminating the time and effort required to change publishing setting 126 and preventing occurrence of a human error associated with the change of publishing setting 126.

Publishing setting 126 also includes information indicating whether or not to publish the process value to external device 200, as shown in FIG. 6. In other words, publishing setting 126 includes information for defining the scope of process values 124 that external device 200 can refer to. This allows control device 100 to improve the security level for process value 124.

Publishing setting 126 includes information that defines whether or not to publish each process value 124 to external device 200, as shown in FIG. 6. Thus, whether or not each process value 124 can be referred to by external device 200 is defined, enabling a precise setting.

Publishing setting 126 also includes information that defines whether to allow and prohibit a Write request, as shown in FIG. 6. This allows changing of process value 124 from the outside of control device 100 and prohibiting a change of process value 124 depending on the state of control device 100. Examples of process value 124 include a process value that, when being changed, does not allow the control program to operate normally. When such a change of process value 124 is allowed during execution of the control program, accordingly, a critical incident that the control program stops occurs. The occurrence of such a critical incident can be prevented as prohibition of a change of process value 124 can be defined.

Operating states of control device 100 include the state in which control program 122 can be changed as in the debug mode and the maintenance mode and the state in which control program 122 cannot be changed as in the run mode, as shown in FIG. 6. The publishing setting is determined dynamically in accordance with whether a relevant state is the state in which control program 122 can be changed or the state in which control program 122 cannot be changed. When changing of control program 122 is allowed, the user wants to check a change of the process value resulting from the change of control program 122. Contrastingly, when the control program is not changed, the user wants to check a situation in which the control program is executed. Specifically, the publishing setting can be defined in accordance with a user's request as the publishing setting is determined dynamically in accordance with whether a relevant state is the state in which control program 122 can be changed or cannot be changed.

Also, when an access request is made with an unpublished process value taken as an access target, as shown in FIG. 7, data set generation unit 1146 stores all the process values that are access targets in payload 1284 regardless of whether these process values are to be published, and converts the process value set to be unpublished into predetermined data and stores the data in payload 1284. Even when an access request is made to a process value, publishing of which is not allowed, thus, data can be exchanged normally between external device 200 and control device 100. In the present embodiment, also, since header 1282 stores data that defines the validity of the data stored in payload 1284, external device 200 can specify a response from control device 100 to the access request by referring to only data set 128 transmitted from control device 100.

Information-related network 4 between control device 100 and external device 200 is a network of a communication protocol according to the OPC-UA. Control device 100 can thus exchange data with external device 200 without depending on the type of the vendor or OS of external device 200.

Control device 100 is communicably connected with support device 400 including accepting unit 412 that accepts publishing setting information. Accepting unit 412 provides user interface 440 for defining publishing setting 126 as shown in FIG. 8. The user can thus define an appropriate publishing setting.

H. Variations (H1. Method of Determining Publishing Setting)

In the embodiment described above, the mode is specified in accordance with the information on at least one of the execution result of control program 122 and the operating state of control device 100, and publishing setting 126 is determined in accordance with the mode. The method of determining a publishing setting is not limited to the method according to the embodiment described above, and it suffices that a publishing setting is determined in accordance with the information on at least one of the execution result of control program 122 and the operating state of control device 100. For example, a publishing setting may be defined for each operating state of control device 100.

When the operating state of field device 300 is defined upon execution of control program 122, a publishing setting may be defined for each operating state of field device 300. For example, a publishing setting may be defined in accordance with the mode or status defined in the packaging machine language (PackML) known as the standard for packaging machines. As the publishing setting of the process value is defined in accordance with the operating state of field device 300, a publishing setting can be changed in accordance with whether field device 300 is stopped or is operating even when the operating state of control device 100 remains unchanged in the run mode. Consequently, a publishing setting can be determined not in accordance with the entirety of control targets controlled by control device 100 but in accordance with an individual state, enabling a more precise publishing setting.

Although a publishing setting is defined for each process value, an attribute may be set for a process value, and process values of the common attribute may be treated as one process value group, to thereby define a publishing setting for each process value group. For example, a publishing setting may be defined for each process value of an attribute A and for each process value of an attribute B, where all process values for control of field device A are taken as process values of attribute A and all process values for control of field device B are taken as process values of attribute B.

In the present embodiment described above, a publishing setting is determined in accordance with the information on at least one of the execution result of the control program and the operating state of control device 100. The publishing setting may be determined in accordance with information on a destination of publishing, in addition to the information about the execution result of control program 122 or the operating state of control device 100. The information on the destination of publishing includes identification information, such as an IP address or a MAC address, for identifying external device 200, and user login information, such as a user name or a password.

For example, the control device may have publishing setting information for each destination of publishing and determine a publishing setting in accordance with the publishing setting information corresponding to the destination of publishing which has made an access request.

(H2. Method of Implementing Data Exchange in Accordance with Publishing Setting)

In the embodiment described above, an unpublished process value is converted into predetermined data, and information that specifies an invalid process value is stored in header 1282. The method of exchanging data in accordance with a publishing setting is not limited to the method according to the embodiment described above.

For example, information that can specify an invalid process value may be stored in a predetermined storage area of control device 100 without being stored in header 1282. In this case, external device 200 may request control device 100 to transmit information that can specify a valid process value or an invalid process value among process values in a data set every time external device 200 receives a data set.

Data indicating being invalid may be determined in advance between control device 100 and external device 200, and an unpublished process value may be converted into data indicating being invalid to be transmitted.

When data is exchanged between control device 100 and external device 200 for an unpublished process value, control device 100 may notify external device 200 of an error. In this manner, external device 200 can return an error to specify that publishing is not allowed. As a result, even when a process value, publishing of which is not allowed, is an access target of external device 200, external device 200 can obtain information indicating that the process value cannot be accessed, allowing normal exchange of data between external device 200 and control device 100.

Control device 100 may define that each data set is allowed to be published, unpublished, or rewritten, and stop transmission per se of a data set that is set to be unpublished.

Control device 100 may write a publishing setting for a data set to a header which is added in the generation of the data set. In this case, external device 200 may read the publishing setting written in the header and discard a data set, publishing of which is not allowed. Also in this case, data about a process value, publishing of which is not allowed, can be exchanged normally.

Control device 100 may write a publishing setting for each of process values stored in a data set to a header added in generation of the data set. In this case, external device 200 may read a publishing setting written in a header, and read a process value, publishing of which is allowed, and discard a process value, publishing of which is not allowed, among the process values stored in the data set.

In other words, the method of implementing data exchange according to a publishing setting is not limited to the embodiment described above.

(H3. Variation of Communication Mode)

Although the above embodiment has been described assuming pub/sub communications, any other communication mode is applicable. Specifically, in the present embodiment, a data set is transmitted periodically when a Read request is made. In other words, once an access request is made, a data set is generated and transmitted periodically even when no access request is made from the external device 200 side. A command and respond communication mode may be applied, in which one response is made to one access request.

In the embodiment described above, a data set is transmitted from control device 100 as being triggered by making of "access request". Control device 100 may transmit a predetermined data set periodically or as an event, not as being triggered by "access request". In this case, external device 200 may obtain a process value that is an access target from the data set transmitted periodically or as an event.

(H4. Variation of User Interface)

In the embodiment described above, support device 400 selects one process value and accepts a publishing setting for each process value selected. Support device 400 may accept a publishing setting for each process value group, where process values of a common attribute are taken as one process value group.

There is no need to accept a publishing setting for all process values. Acceptance of publishing setting may be prohibited for predetermined process values, and acceptance of a publishing setting may be allowed for the other process values. Alternatively, acceptance of a publishing setting may be allowed for predetermined process values, and acceptance of a publishing setting may be prohibited for the other process values.

(H5. Method of Implementing OPC-UA Communications)

In the embodiment described above, communications between control device 100 and external device 200 may be performed using a communication protocol according to the OPC-UA, and the function of the OPC-UA server and the function of the OPC-UA client are installed in control device 100 and external device 200, respectively. The method of implementing communications between control device 100 and external device 200 using a communication protocol according to the OPC-UA is not limited to the method of the embodiment described above. For example, the function of an OPC-UA server installed in control device 100 may be added on interprocess communication (IPC).

Communications according to the OPC-UA may be implemented by providing a dedicated gateway between control device 100 and external device 200. Alternatively, a communication unit which is communicable with control device 100 via an internal bus may be provided, and the communication unit is caused to function as the OPC-UA server, thereby implementing communications according to the OPC-UA.

(H6. Variation of Control System)

Figure 9:
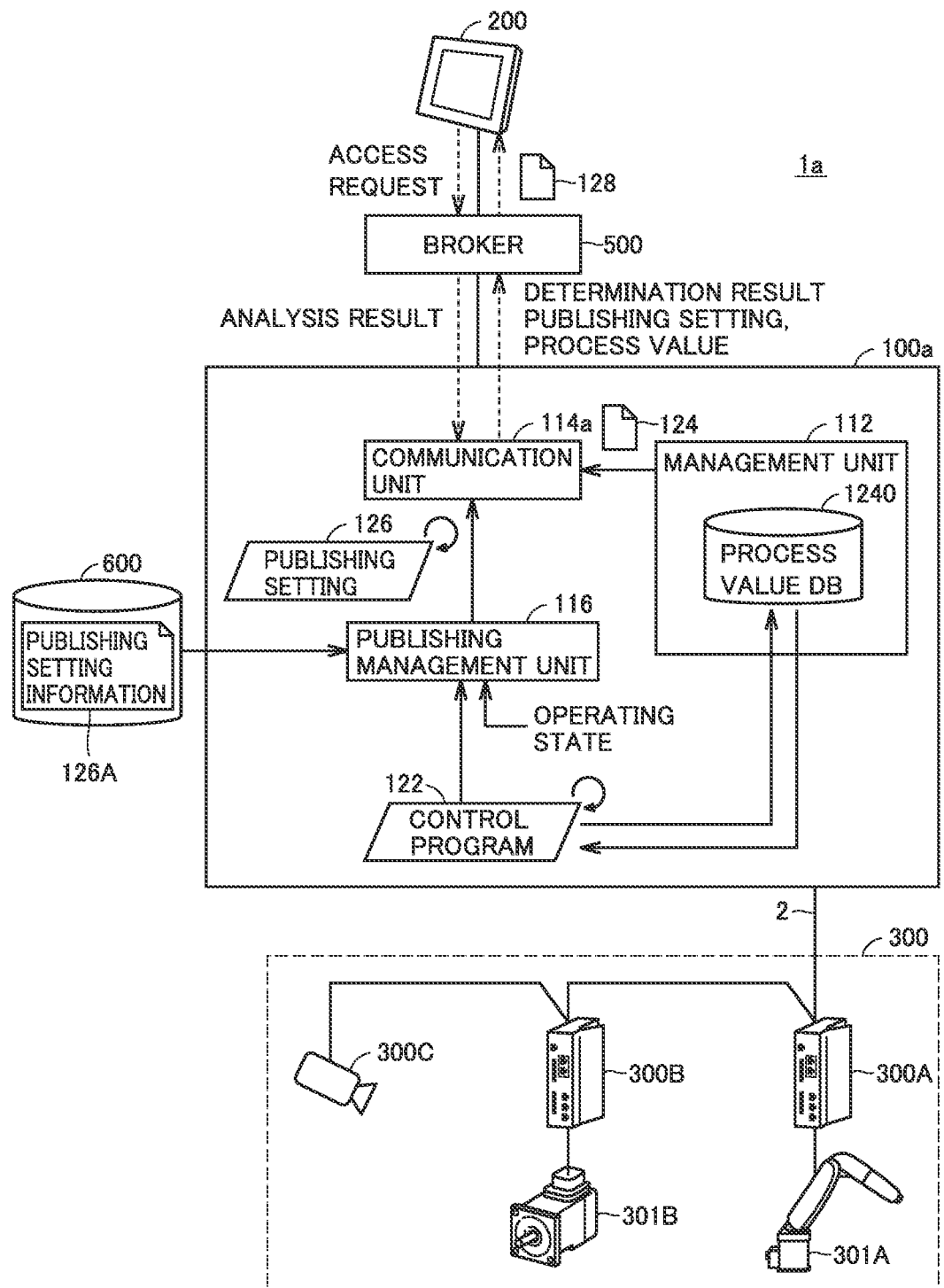
FIG. 9 shows a control system 1a in a variation.

Each function of control device 100 shown in FIG. 5 may be included in any other device communicable with control device 100. FIG. 9 shows a control system 1a in a variation. Control system 1a is different from control system 1 according to the embodiment described above in that control system 1a includes control device 100a in place of control device 100 and includes a broker 500 and a database server 600.

Control device 100a is different from control device 100 in that it includes a communication unit 114a in place of communication unit 114. Control device 100a is also different from control device 100 in that it does not include publishing setting information 126A. In control system 1a, publishing setting information 126A is stored in database server 600.

In control system 1a according to FIG. 9, broker 500 includes functions relating to analysis unit 1142, data set generation unit 1146, and transmission unit 1148 shown in FIG. 5. Broker 500 analyzes an access request from external device 200 and notifies control device 100a of an analysis result. When the access request is a Write request, control device 100a determines whether to rewrite the process value and notifies broker 500 of a determination result. When the access request is a Read request, control device 100a transmits, to broker 500, a process value 124 that is the access target and the publishing setting determined in accordance with the publishing setting information stored in database server 600. Broker 500 generates data set 128 in accordance with process value 124 and the publishing setting and transmits data set 128 to external device 200.

As described above, each function included in control device 100 shown in FIG. 5 can be replaced with any other device communicably connected with control device 100, and control device 100 needs not to have all functions.

Control device 100a shown in FIG. 9 is communicable with database server 600 and dynamically determines publishing setting 126 in accordance with publishing setting information 126A stored in database server 600. In other words, publishing setting information 126A for determining publishing setting 126 may be stored externally, not in storage 120 of control device 100a. Thus, the memory of control device 100a can be reduced.

(H7. Variation of External Device)

Although the above embodiment has been described assuming that external device 200 is a display device such as an HMI, external device 200 may be a device connected for data collection, such as a supervisory control and data acquisition (SCADA) device or a database server.

(H8. Variation of Operating State)

Figure 10:
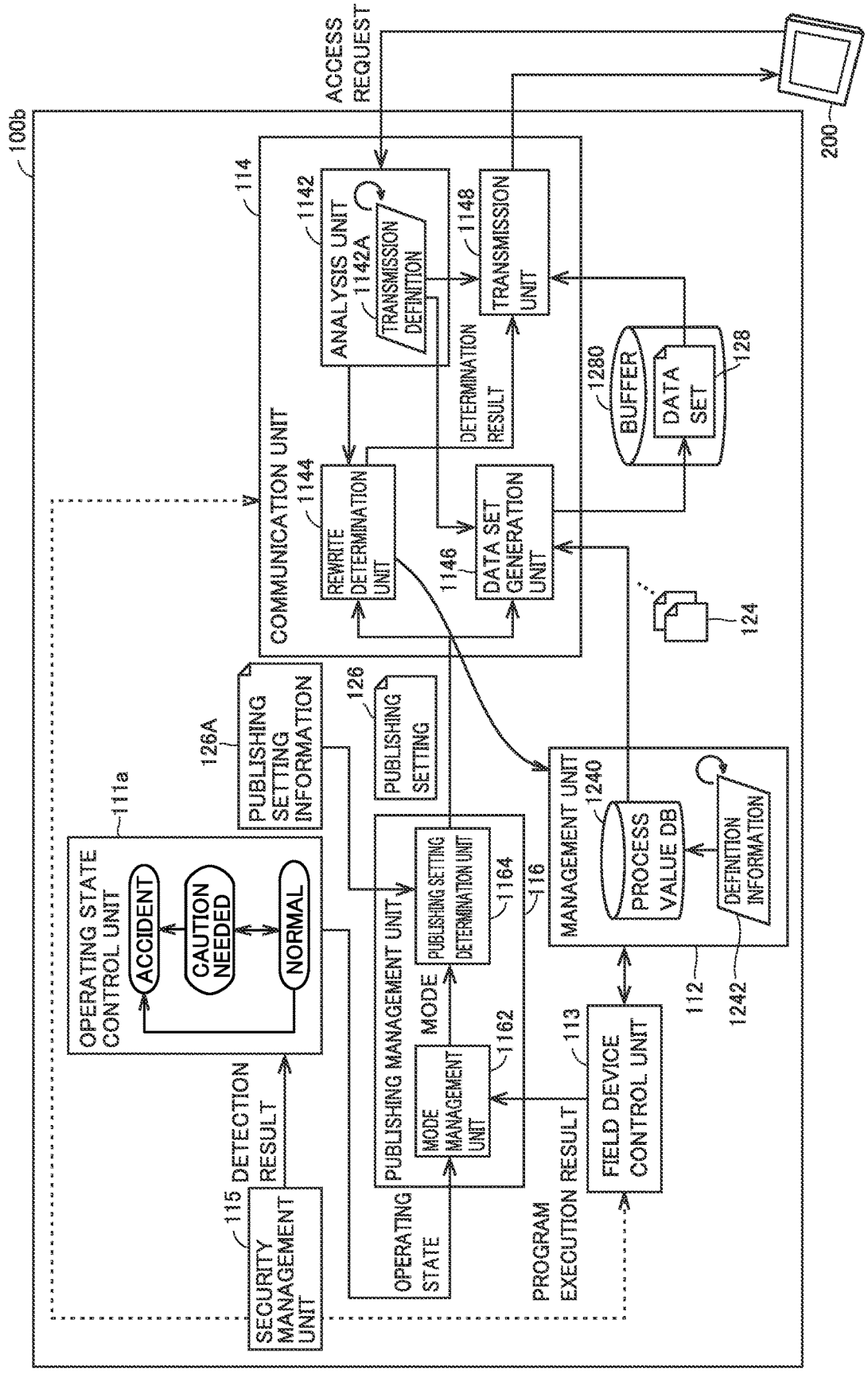
FIG. 10 shows an example functional configuration of a control device 100b in a variation.

FIG. 10 shows an example functional configuration of a control device 100b in a variation. Control device 100b is different from control device 100 according to the embodiment described above in that control device 100b includes an operating state control unit 111a in place of operating state control unit 111 and includes a security management unit 115.

Security management unit 115 detects any unauthorized intrusion occurring in control device 100. Herein, to "detect any unauthorized intrusion" module to detect a phenomenon or an unusual state that can be any security threat. The detection of an unauthorized intrusion merely module the detection of the generation of a phenomenon or state different from a normal phenomenon or state. In other words, "occurrence of an incident" is not meant immediately as an unauthorized intrusion is detected.

Security management unit 115 monitors communication unit 114 and field device control unit 113 to detect any unauthorized intrusion occurring in control device 100. For example, security management unit 115 detects, for example, a computer virus that invades from information-related network 4 via communication unit 114, a distributed denial of service (DDoS) attack to which communication unit 114 is subjected, and an unauthorized access to control device 100. Security management unit 115 detects unauthorized tamper or the like via control-related network 2 by monitoring field device control unit 113.

Operating state control unit 111a performs control to any of the state with no incident occurring and a state according to the nature of an occurring incident, in accordance with the detection result of security management unit 115. "Incident" includes a stage at which a serious accident has occurred and a prior stage which may lead to a serious accident.

Whether an incident has occurred or not and the nature of an occurring incident may be determined by any of operating state control unit 111a and security management unit 115. In the example shown in FIG. 10, description will be given assuming that operating state control unit 111a performs such determination.

In the example shown in FIG. 10, when determining that no incident has occurred based on the unauthorized intrusion detection result, operating state control unit 111a performs control to "normal mode". No incident having occurred typically module that no unauthorized intrusion has been detected.

Even when an incident has occurred, operating state control unit 111a performs control to any of "accident mode" and "caution-needed mode" in accordance with the nature of the incident.

"Accident mode" is a state to which control is performed when it is determined that a serious accident has occurred or a serious accident is highly likely to occur based on the unauthorized intrusion detection result. For example, "accident mode" is a state to which control is performed when a computer virus is detected and when a period during which a DDoS attack continues exceeds a predetermined period.

"Caution-needed mode" is a state to which control is performed when it is determined that a serious accident is highly likely to occur based on the unauthorized intrusion detection result. For example, "caution-needed mode" is a state to which control is made until the predetermined period is exceeded from the start of the DDoS attack.

In other words, the operating states of control device 100b in the variation are states defined centering around "security environment".

Publishing management unit 116 determines a publishing setting in accordance with the state controlled by operating state control unit 111a. For example, publishing management unit 116 sets a publishing setting to have the widest scope of publishing in "normal mode", have the second-widest scope of publishing in "caution-needed mode", and have the narrowest scope of publishing in "accident mode".

Thus, a publishing setting can be made in accordance with the nature of the incident, allowing control device 100b to improve a security level.

Although "the state according to the nature of the incident" is a state according to the threat level of an occurring incident in the example shown in FIG. 10, this state may be a state according to the type of an incident, or a state defined in accordance with the type of an incident and the threat level of the incident. Examples of the type of the incident include "DDoS attack", "spoofing", "unauthorized tamper", and "viral invasion".

The state according to the nature of an incident may be a state managed by a user program created through design by a user operating support device 400. In other words, the user may appropriately define the state according to the nature of an incident in accordance with an unauthorized intrusion detection result.

The user may appropriately define the scope of publishing for each state according to the nature of an incident. Specifically, the user may appropriately define the scope of publishing in accordance with an unauthorized intrusion detection result.

The function of security management unit 115 may not be included in control device 100b. For example, some or all of the functions of security management unit 115 may be provided in a unit (device) communicable with control device 100b via an internal bus or the like.

The control device may include both of operating state control unit 111 of the embodiment described above and operating state control unit 111a of the variation shown in FIG. 10. Specifically, the control device may determine a publishing setting in accordance with the operating state defined in accordance with the execution state of "control program" and the operating state defined in accordance with "security environment" as in the variation shown in FIG. 10.

I. Notes

As descried above, the embodiment and the variations include the following disclosure.
(Configuration 1)
A control device (100, 100a, 100b) that executes a control program for controlling a control target, the control device comprising:
  management module (112) configured to manage one or more process values (124) relating to the execution of the control program;
  communication module (114) configured to exchange data (128) including at least part of the one or more process values with an external device (200) in accordance with a publishing setting (126) for the one or more process values; and
  publishing management module (116) configured to dynamically determine the publishing setting in accordance with information on at least one of an execution result of the control program and an operating state of the control device.
(Configuration 2)
The control device according to configuration 1, wherein the publishing setting includes information that defines a scope of process values that the external device is allowed to refer to among the one or more process values.
(Configuration 3)
The control device according to configuration 1 or 2, wherein the publishing setting includes information that defines whether or not each of the one or more process values is allowed to be referred to by the external device.
(Configuration 4)
The control device according to any one of configurations 1 to 3, wherein the publishing setting includes information that defines whether or not a target process value is changeable in accordance with a command from the external device.

(Configuration 5)
The control device according to any one of configurations 1 to 4, wherein
  the execution result of the control program includes an operating state of the control target, and
  the publishing management module dynamically determines the publishing setting in accordance with the operating state.
(Configuration 6)
The control device according to any one of configurations 1 to 5, wherein the operating state of the control device includes a state in which a change of the control program is allowed and a state in which a change of the control program is prohibited.
(Configuration 7)
The control device according to any one of configurations 1 to 6, wherein the operating state of the control device is a state that changes in accordance with a result of detection of any unauthorized intrusion occurring in the control device, and the operating state includes a state with no incident occurring and a state corresponding to nature of an occurring incident.
(Configuration 8)
The control device according to any one of configurations 1 to 7, wherein when the one or more process values exchanged with the external device include a process value, publishing of which is not allowed, the communication module transmits information indicating that publishing is not allowed.
(Configuration 9)
The control device according to any one of configurations 1 to 7, wherein among the one or more process values exchanged with the external device, the communication module converts a process value, publishing of which is not allowed, into predetermined data and transmits the predetermined data.
(Configuration 10)
The control device according to any one of configurations 1 to 9, wherein the communication module exchanges data with the external device using a communication protocol according to an object linking and embedding for process control unified architecture (OPC-UA).
(Configuration 11)
The control device according to any one of configurations 1 to 10, wherein
  the control device is communicable with a storage device (600) configured to store publishing setting information (126A) in which the publishing setting is associated with a control state defined in accordance with the information on at least one of the execution result of the control program and the operating state of the control device, and
  the publishing management module dynamically determines the publishing setting in accordance with the information on at least one of the execution result of the control program and the operating state of the control device and the publishing setting information.
(Configuration 12)
A management program (114A, 116A) for managing data exchange between a control device configured to execute a control program for controlling a control target and an external device,
  the management program causes a computer to execute the steps of:
    managing one or more process values relating to the execution of the control program;
    exchanging data including at least part of the one or more process values between the control device and the external device in accordance with a publishing setting for the one or more process values; and dynamically determining the publishing setting in accordance with information on at least one of an execution result of the control program and an operating state of the control device.

(Configuration 13)

A control system (1, 1a) comprising:

execution module (110) configured to execute a control program for controlling a control target;

management module (112) configured to manage one or more process values relating to the execution of the control program;

communication module (114, 114a, 500) configured to exchange data including at least part of the one or more process values with an external device in accordance with a publishing setting for the one or more process values; and publishing management module (116, 600) configured to dynamically determine the publishing setting in accordance with information on at least one of an execution result of the control program and an operating state of the execution module.

(Configuration 14)

The control system according to configuration 13, further comprising:

storage module (120, 600) configured to store publishing setting information (126A) in which the publishing setting is associated with a control state defined in accordance with the information on at least one of the execution result of the control program and the operating state of the execution module; and accepting module (412) configured to accept the publishing setting information, wherein the publishing management module dynamically determines the publishing setting in accordance with the information on at least one of the execution result of the control program and the operating state of the execution module and the publishing setting information, and the accepting module provides a user interface (440) for defining the publishing setting.

It should be understood that the embodiment disclosed herein is illustrative and non-restrictive in every respect. The scope of the present invention is defined by the terms of the claims, rather than the description above, and is intended to include any modifications within the meaning and scope equivalent to the terms of the claims. It is also intended that the inventions described in the embodiment and variations thereof can be carried out alone or in combination whenever possible.

REFERENCE SIGNS LIST 1, 1a control system; 2 control-related network; 4 information-related network; 100, 100a, 100b control device; 104 chip set; 106, 202, 402 main memory; 108 internal bus controller; 110, 210, 410 processor; 111, 111a operating state control unit; 111A operating state control program; 112 management unit; 113 field device control unit; 114, 114a communication unit; 114A, 222 OPC-UA program; 115 security management unit; 116 publishing management unit; 116A publishing management program; 120, 220, 420 storage; 122 control program; 124 process value; 124A first process value; 124B second process value; 124C third process value; 126 publishing setting; 126A publishing setting information; 128 data set; 142 control-related network IF; 144 information-related network IF; 146, 460 USB controller; 148 memory card IF; 148A memory card; 200 external device; 204, 408 processor bus; 240 communication IF; 260 touch panel; 262, 406 display unit; 264, 404 input unit; 300 field device; 300A robot controller; 300B servo driver; 300C sensor; 301A robot; 301B servo motor; 400 support device; 412 accepting unit; 430 optical drive; 432 recording medium; 440 user interface; 442 process value accepting area; 444 publishing setting accepting area; 446 determination tab; 448 cancellation tab; 500 broker; 600 database server; 1142 analysis unit; 1142A transmission definition; 1144 rewrite determination unit; 1146 data set generation unit; 1148 transmission unit; 1162 mode management unit; 1164 publishing setting determination unit; 1240 process value DB; 1242 definition information; 1280 buffer; 1282 header; 1284 payload.

The invention claimed is:

1. A control device that executes a control program for controlling a control target, the control device comprising a storage that stores one or more programs and one or more processors, wherein:

at least one of the one or more processors accesses the storage and executes the one or more programs to cause the at least one of the one or more processors to implement a management module configured to manage one or more process values relating to the execution of the control program;

at least one of the one or more processors accesses the storage and executes the one or more programs to cause the at least one of the one or more processors to implement a communication module configured to exchange data including at least part of the one or more process values with an external device in accordance with a publishing setting for the one or more process values; and at least one of the one or more processors accesses the storage and executes the one or more programs to cause the at least one of the one or more processors to implement a publishing management module configured to dynamically determine the publishing setting in accordance with information on an execution result of the control program and an operating state of the control device, wherein the operating state of the control device is a state that changes in accordance with a result of detection of any unauthorized intrusion occurring in the control device, the operating state includes a state with no incident occurring and a state corresponding to a nature of an occurring incident, the state corresponding to a nature of an occurring incident includes a state in a first mode corresponding to a stage at which an accident has occurred and a state in a second mode corresponding to a stage before an accident occurs, and the publishing management module causes a scope of data published by the publishing setting to be narrower in the first mode than in the second mode.

2. The control device according to claim 1, wherein the publishing setting includes information that defines a scope of process values that the external device is allowed to refer to among the one or more process values.

3. The control device according to claim 1, wherein the publishing setting includes information that defines whether or not each of the one or more process values is allowed to be referred to by the external device.

4. The control device according to claim 1, wherein the publishing setting includes information that defines whether or not a target process value is changeable in accordance with a command from the external device.

5. The control device according to claim 1, wherein:
the execution result of the control program includes an operating state of the control target, and
the publishing management module dynamically determines the publishing setting in accordance with the operating state of the control target.

6. The control device according to claim 1, wherein the operating state of the control device includes a state in which a change of the control program is allowed and a state in which a change of the control program is prohibited.

7. The control device according to claim 1, wherein when the one or more process values exchanged with the external device include a process value, publishing of which is not allowed, the communication module transmits information indicating that publishing is not allowed.

8. The control device according to claim 1, wherein among the one or more process values exchanged with the external device, the communication module converts a process value, publishing of which is not allowed, into predetermined data and transmits the predetermined data.

9. The control device according to claim 1, wherein the communication module exchanges data with the external device using a communication protocol according to an object linking and embedding for process control unified architecture (OPC-UA).

10. The control device according to claim 1, wherein:
the control device is communicable with a storage device configured to store publishing setting information in which the publishing setting is associated with a control state defined in accordance with the information on the execution result of the control program and the operating state of the control device, and
the publishing management module dynamically determines the publishing setting in accordance with the information on the execution result of the control program and the operating state of the control device and the publishing setting information.

11. A non-transitory recording medium storing a management program for managing data exchange between a control device configured to execute a control program for controlling a control target and an external device,
the management program, when executed by a computer, causes the computer to at least:
manage one or more process values relating to the execution of the control program;
exchange data including at least part of the one or more process values between the control device and the external device in accordance with a publishing setting for the one or more process values; and
dynamically determine the publishing setting in accordance with information on at least one of an execution result of the control program and an operating state of the control device,
wherein the operating state of the control device is a state that changes in accordance with a result of detection of any unauthorized intrusion occurring in the control device,
the operating state includes a state with no incident occurring and a state corresponding to a nature of an occurring incident,
the state corresponding to a nature of an occurring incident includes a state in a first mode corresponding to a stage at which an accident has occurred and a state in a second mode corresponding to a stage before an accident occurs, and
the publishing setting is dynamically determined to cause a scope of data published by the publishing setting to be narrower in the first mode than in the second mode.

12. A control system comprising:
a control device including a storage that stores one or more programs and one or more processors, wherein:
at least one of the one or more processors accesses the storage and executes the one or more programs to cause the at least one of the one or more processors to implement an execution module configured to execute a control program for controlling a control target;
at least one of the one or more processors accesses the storage and executes the one or more programs to cause the at least one of the one or more processors to implement a management module configured to manage one or more process values relating to the execution of the control program;
at least one of the one or more processors accesses the storage and executes the one or more programs to cause the at least one of the one or more processors to implement a communication module configured to exchange data including at least part of the one or more process values with an external device in accordance with a publishing setting for the one or more process values; and
at least one of the one or more processors accesses the storage and executes the one or more programs to cause the at least one of the one or more processors to implement a publishing management module configured to dynamically determine the publishing setting in accordance with information on an execution result of the control program and an operating state of the execution module,
wherein the operating state of the execution module is a state that changes in accordance with a result of detection of any unauthorized intrusion occurring in the execution module,
the operating state includes a state with no incident occurring and a state corresponding to a nature of an occurring incident,
the state corresponding to a nature of an occurring incident includes a state in a first mode corresponding to a stage at which an accident has occurred and a state in a second mode corresponding to a stage before an accident occurs, and
the publishing management module causes a scope of data published by the publishing setting to be narrower in the first mode than in the second mode.

13. The control system according to claim 12, wherein:
at least one of the one or more processors accesses the storage and executes the one or more programs to cause the at least one of the one or more processors to implement a storage module configured to store publishing setting information in which the publishing setting is associated with a control state defined in accordance with the information on the execution result of the control program and the operating state of the execution module; and
wherein the control system further comprises a support device that is connected to the control device and that implements a user interface configured to receive the publishing setting information,
wherein
the publishing management module dynamically determines the publishing setting in accordance with the information on the execution result of the control program and the operating state of the execution module and the publishing setting information, and wherein the user interface defines the publishing setting.

14. The control system according to claim 12, wherein the publishing setting includes information that defines a scope of process values that the external device is allowed to refer to among the one or more process values.

15. The control system according to claim 12, wherein the publishing setting includes information that defines whether or not each of the one or more process values is allowed to be referred to by the external device.

16. The control system according to claim 12, wherein the publishing setting includes information that defines whether or not a target process value is changeable in accordance with a command from the external device.

17. The control system according to claim 12, wherein:
   the execution result of the control program includes an operating state of the control target, and
   the publishing management module dynamically determines the publishing setting in accordance with the operating state of the control target.

18. The control system according to claim 12, wherein the operating state of the control device includes a state in which a change of the control program is allowed and a state in which a change of the control program is prohibited.

* * * * *